Aug. 11, 1970  W. MASSMANN  3,523,595

FRICTION MEMBER FOR BRAKES

Filed Sept. 9, 1968

Inventor:
Willi Massmann
By Walter Becker

United States Patent Office 3,523,595
Patented Aug. 11, 1970

3,523,595
FRICTION MEMBER FOR BRAKES
Willi Massmann, Essen, Germany, assignor to
PAG Presswerk AG, Essen, Germany
Filed Sept. 9, 1968, Ser. No. 758,376
Claims priority, application Germany, Sept. 9, 1967,
1,625,793
Int. Cl. F16d 69/00
U.S. Cl. 188—251                 2 Claims

ABSTRACT OF THE DISCLOSURE

A brake-lining body having an outer friction surface at least partially covered with a coating comprising a polishing paste means including a polishing medium and including a binding-agent substance adapted to disintegrate and decompose as a result of operating at normal braking temperature.

---

The present invention relates to a friction body for brakes, especially drum brakes and disc brakes of motor vehicles.

It is known to surface machine the so-called counter material of brakes, for instance, the brake drum of a drum brake or the brake disc of a disc brake, said surface machining being effected at the friction surface which cooperates with the friction body. Such surface machining is necessary for good conditions of operation of the brake. Thus, for instance, too rough a friction surface of the counter material may lead to an undue fast wear of the friction body, or an uneven friction surface may cause noisy vibrations.

It is also known that the material and the composition of the friction body should be so selected with regard to the brakes that certain friction values or retarding values are realized between the counter material and the friction body so that the brake will have the desired braking properties and the desired braking characteristic. When the counter material is soiled or rusty, considerable and dangerous changes in the friction values and retarding values will be encountered as will be explained further below in connection with a vehicle brake.

For instance, when assembling the brake, the counter material may easily be soiled by oil, grease, or the like. In particular, the metallic shiny machined frictioned surfaces of the counter material may easily rust, for instance, during the transport of the vehicle from the manufacturer to the dealer and before the vehicle is eventually sold to a customer. Such soiling and formation of rust may bring about that due to reduced friction values between the counter material and the friction bodies, the intended retarding values are not realized by the brake so that when the brake is actuated by the driver, the expected braking effect will not be obtained. According to another possibility, a non-uniform braking effect may occur at the individual wheels whereby the vehicle may be laterally deviated and may skid.

A vehicle with a brake installation which cannot produce the prescribed braking effect and which does not produce the same braking effect on the right-hand wheels as produced on the left-hand wheels, is not safe for traffic and represents a great danger for the driver and for the traffic.

A removal of the brake, cleaning of the counter material by hand and re-assembling of the brake is very time consuming and expensive. If it is desired to place the brake installation into proper condition by actuating the brake so that the counter material by means of the friction body will be ground off and cleaned, it is necessary to drive over a relatively long distance and to actuate the brake for a long time which is likewise time consuming and expensive and requires an expert in order to avoid damages.

Realizing the above difficulties, industry has endeavored to overcome the above-mentioned drawbacks and to find suitable solutions which will make it possible easily and reliably to clean the counter material of brakes and to assure that motor vehicles are sold to the individual customer with the brake installation in good and properly functioning condition. To this end it is known during the assembly of the brake to protect the friction surface of the counter material against rusting by the application of a corrosion-resistant oil. Such corrosion-resistant protective means are very expensive. Drops falling out of the brake may attack the vehicle tires and may damage the same when they contact the rubber. Furthermore, such drops dissolve the asphalt in the assembly halls and storage places. It is also to be noted that such corrosion protective means cause a friction drop which may amount to, for instance, 20% so that also such brake in new condition is not 100% traffic-safe and has to be driven hot by an expert by subjecting the brake to considerable stresses so that the corrosion protective oil will be removed. It is for this reason that the counter material during the assembly of the brake has also been protected by varnishing. Varnishing or lacquering results in a considerable friction drop which may amount to, for instance, 75% so that also such brake in new condition is not traffic-safe. The lacquer has, therefore, either to be shaved off or has to be burned off by subjecting the brake to a considerable stress and by driving hot the counter material which, in turn, requires expert treatment of the brake. If the cleaning of the brake is not effected, it will take from, e.g. 300 to 500 kilometers driving to break-in the brake to such an extent that the danger inherent to a friction drop will be eliminated. The methods of providing the counter material with a protective coating for preventing soiling and especially the formation of rust, thus have the drawbacks that the protective means are rather expensive, change the friction values of the brake so that the brake in new condition is not traffic-safe, and that, therefore, prior to putting the brake into operation a relatively cumbersome and expensive removal of the coating is required.

With the disc brakes it has been customary prior to placing the brakes into operation to disassemble the friction members and to replace the same by corundum blocks of similar dimensions in order, by means of said blocks and by engaging the brake, to free the brake disc from soil or rust whereupon the friction bodies are again built into the brake. This type of cleaning the counter material likewise requires time-consuming and expensive assembly work. In addition there to, it is rather difficult, even for an expert in this field, to press the corundum blocks by engaging the brake against the friction surfaces of the counter material in such a way that the surface will not be attacked by the grinding material. Therefore, there exists the danger that the surface of the counter material may show grinding tracks or may have too rough a surface. For this reason, fine sandpaper has been cemented to the friction body in order by engaging the brake to grind off the counter material by means of the sand paper and to clean the counter material from soil and rust. However, the sand paper wears off too fast, frequently detaches itself from the friction body and flies off so that the counter material is cleaned only incompletely or only at certain places. This may result, for instance, in different retarding values at one and the same brake disc when the two braking surfaces on both sides of the brake disc have been cleaned to a different degree and also may result in different retarding values in the brakes of the individual wheels of the vehicle.

It is, therefore, an object of the present invention to provide a friction body for brakes which will overcome the above mentioned drawbacks.

It is another object of this invention to provide a friction body for brakes which at low cost and with a minimum of material will be able in a simple and easy manner to bring about a cleaning of the counter material of the brake when the brake installation is put into operation.

It is also an object of this invention to provide a friction body as set forth in the preceding paragraphs, which will bring about that the brake will practically from the very start be completely safe in operation without the possibility that the cleaning of the counter material may cause damage or may require expert personnel for the breaking-in of the brake installation.

These and other objects and advantages of the invention will appear more clearly from the following specification in connection with the accompanying drawing, in which.

Figure 1:
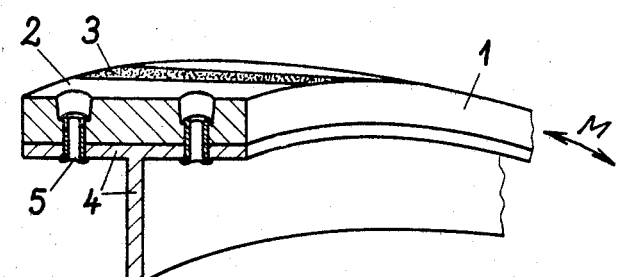
FIG. 1 illustrates partially in section a friction member for a drum brake.

The friction body or friction member for brakes according to the present invention is characterized primarily in that friction surface of the friction body which faces the counter material of the brake is at least partially covered with a solidifying polishing paste which contains a solidifying binding substances, the solidified binding agent of the solidified polishing paste being adapted to disintegrate at the temperature of operation of the brake. The cover or coating of the friction body which consists of the solidified polishing paste brings about that, when breaking-in the brake, immediately a thorough and complete cleaning of the counter material is effected which cleaning operation treats the friction surface of the counter material gently and does not cause roughening or damage thereto. This breaking-in operation may be effected, for instance, when the dealer carries out the customary inspection of a vehicle prior to the handing-over of the vehicle to the customer, so that the customer will receive the vehicle with a brake installation in proper operative and traffic-safe condition without requiring special work or steps. The solidified binding substance of the cover or coating disintegrates at the temperature of operation which develops when actuating the brake so that the polishing paste is discarded as wear.

The friction surface of the friction body may be covered completely with the polishing paste. However, experience has shown that already a partial coating of the friction surface in the form of one or more narrow strips may be sufficient to clean the friction surface of the counter material by means of one or two breaking operations. It has furthermore been found that even a very thin coat will suffice which may be obtained by depositing a thin layer of polishing paste on the friction surface of the friction body. Of course, if desired, a coat of any desired thickness may be employed, e.g. by fitting the polishing paste into more or less deep grooves provided in the brake body or brake member when producing the same, to obtain any desired life span of the polishing strip.

For the cover or coating under consideration, any polishing paste may be used which will solidify and the binding substance of which will disintegrate at the temperature of operation of the brake. By a proper selection of the polishing substance and the binding substance for producing the polishing paste, and by selecting a proper mixing ratio of polishing substance and binding substance, it can advantageously be obtained that the friction value of the cover or coating formed by the solidified polishing paste will approximately correspond to the friction value of the friction body so that prior to and after the cleaning of the counter material or prior to and after the disintegration of the coating optimum equal retarding values of the brake will be realized. Since the motor vehicles are already during the manufacturing process moved about on the storing places and when loading the vehicles on transporting means by their own motor power, the brakes are already actuated prior to the vehicle being operated by the customer. In such instances, by suitably selecting the binding substance and by selecting a corresponding thickness of the cover or coating, it is possible to assure that the friction body, when the vehicle is put into operation, will still have a sufficient coat of polishing paste for cleaning the counter material. It has been found particularly advantageous, especially for friction bodies of motor vehicle brakes, to employ a coating or cover which contains fine granular quartz powder as polishing substance and epoxy resin as binding substance. In this way a cover or coating can be produced which will solidify at room temperature, which means that it hardens at room temperature after it has been applied to the friction body without requiring a heat treatment or other corresponding steps. Such coating or cover will disintegrate at a temperature of approximately 200° C., so that the cover or coating will be reduced and eliminated at the temperature of operation customary in vehicle brakes.

Referring now to the drawing is detail, showing two embodiments of the friction body according to the invention, the friction body of FIG. 1 has the customary shape of a brake lining for drum brakes. The friction body 1 may, in a manner known per se, consist of one or more layers and may be connected to the brake jaw 4, which serves as carrier for the friction body, by means of rivets 5 or may be cemented or pressed onto the brake jaw, as is customary in connection with ordinary vehicle brakes.

The friction surface 2 of the brake body 1 is partially coated by applying thereto a solidifying polishing paste 3. The solidified coat 3 is, according to FIG. 1, applied in the form of narrow strips which extend in a direction transverse to the direction of movement M of the friction body 1 and brake drum of the brake relative to each other. As will be seen from FIG. 1, the strips 3 extend over the entire width of the friction surface 2 of the friction body so that the corresponding friction surfaces of the brake drum will be engaged by the coating 3 when the brake is actuated.

Figure 2:
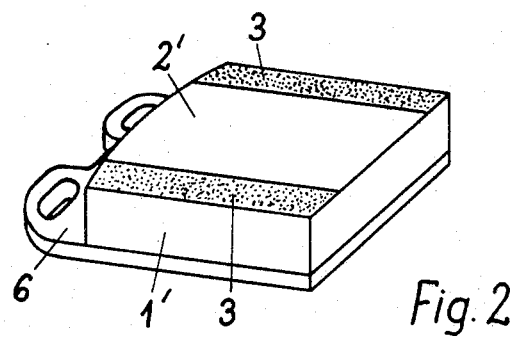
FIG. 2 shows a friction member according to the invention.

FIG. 2 shows a friction body 1' of a shape known per se in connection with disc brakes of motor vehicles, said friction body 1' being cemented to and pressed upon a carrier plate 6 in a manner known per se. The friction surface 2' of the friction body has those marginal areas thereof which extend transverse to the direction of movement of the brake disc provided with a polishing paste. The paste has been applied in the form of strips having a width of from 6 to 7 millimeters which strips have solidified at room temperature. Such friction bodies were built into disc brakes with brake discs strongly covered with rust. After one or two braking operations, the brake disc was free from rust. It was also ascertained that a uniform surface of the brake disc had been realized whereby the influence was eliminated which normally results from different grinding patterns caused by the machining of the brake disc. Thus, the present invention not only results in a proper cleaning of rusted brake discs, but also with regard to factory-new clean brake discs brings about a considerable improvement of the brake performance during the breaking-in of the brake.

Figure 3:
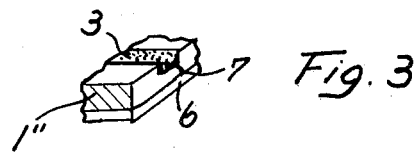
FIG. 3 shows a portion of a friction member which differs slightly from the friction member of FIGS. 1 and 2 in that the polishing strip is located in groove means of the friction surface of the friction member.

With regard to the arrangement shown in FIG. 3, this figure shows a small portion of a friction member 1'' which differs slightly from the friction members of FIGS. 1 and 2 in that the polishing strip 3 is located in groove means 7 of the friction surface of the friction member 1''.

For the sake of completeness, there may now be set forth two specific examples for the polishing material as it may be used in connection with the present invention.

EXAMPLE I

As polishing paste may be used a mixture of fine granular quartz powder and an epoxy resin which serves as binding substance. The said fine granular quartz powder preferably has a granular size of from 0.05 to 0.4 millimeter. The mixing ratio of the polishing paste to the quartz powder is preferably 60% by weight of quartz powder to 40% by weight of epoxy resin.

The application of the polishing paste may, in conformity with FIG. 2 be effected by pasting the polishing paste in the form of two strips onto the braking member 1, each strip having a width of from 7 to 10 millimeters and a thickness of approximately 0.5 millimeter. While the solidification of the paste will take place at room temperature, the solidification may be accelerated by subjecting the same to a heat of from 150 to 160° C., for instance in a heating oven, for a period of approximately twenty minutes.

The solidified polishing paste, and more specifically the binding substance thereof, disintegrates at a temperature of approximately 200° C.

It has been found that with layers 3 of the above-identified type applied to the brake member, it is possible to free even strongly rusted brake discs by only one or two braking operations. Depending on the duration and the braking forces, the above-outlined layers 3 will, up to complete disintegration of said layers, suffice for from 10 to 40 braking operations. Therefore, the buyer of a motor vehicle will be able even if the vehicle has been standing still for a longer period of time, to completely clean rusted brake discs even when the vehicle was driven under its own force during the manufacture and during the transport of the vehicle prior to its sale to the eventual owner. The above-mentioned number of the barking operations relates to a medium velocity of 60 kilometers per hour and to a pressure in the braking conduit of approximately 300 atmospheres above atmospheric pressure. Taking into consideration the piston diameter of the brake cylinder and the surface of the brake lining, a pressure for the disc brake lining of 5,430 kilograms and thus a surface load of the brake lining of 210 kilograms per square centimeter, will be obtained.

EXAMPLE II

This example, which applies to FIG. 3, follows primarily that of Example I with the exception that the friction member is provided with grooves 6 having a width of 10 millimeters and a depth of 5 millimeters. The polishing paste is either filled into the grooves where it solidifies, or bars or strips are prepared from the polishing paste and after their solidification are inserted into the grooves of the friction member and cemented thereto.

By varying the thickness or layer, the desired life span of the layers will be obtained.

It is, of course, to be understood that the present invention is, by no means, limited to the specific showing in the drawing, but also comprises numerous modifications, the scope of the invention being determined by the invention. Thus, if desired, but by no means necessary, the friction surface 2 may also have its entire or major surface coated with the coat 3 above referred to.

What I claim is:

1. A friction brake member, especially for connection to supporting means of drum brakes and disc brakes of motor vehicles and having a body portion to be braked, comprising: finished brake-lining means adapted to be connected to the supporting means and having an outer surface completed for frictional engagement with the body portion to be braked, and a polishing paste means temporarily at least partially covering said outer surface of said brake-lining means, said polishing paste means only including exclusively a polishing-agent substance and a post-solidified binding-agent substance readily disintegrating and decomposing when subjected to a temperature corresponding to temperature occurring during normal braking operation of said brake member.

2. A method of providing a finished friction brake member with temporary means for eliminating rust and soiling of the counter surface cooperating with said friction brake member, which includes the step of: at least partially coating subsequently the completed outer surface of said friction brake member temporarily with only a polishing-paste means including polishing-agent and binding-agent substances exclusively solidifying at room temperature and including a binding-agent substance adapted when in solidified condition independently to disintegrate and decompose readily at the normal temperature of operation of the brake of longer lasting material.

References Cited

UNITED STATES PATENTS

| | | |
|---|---|---|
| 511,298 | 12/1893 | Hall. |
| 2,136,585 | 11/1938 | Bruce. |
| 2,201,191 | 5/1940 | Matthews. |
| 3,212,869 | 10/1965 | Decker _____ 51—298 |
| 3,415,635 | 12/1968 | Hallewell _____ 51—298 |

GEORGE E. A. HALVOSA, Primary Examiner

U.S. Cl. X.R.

51—298; 192—107